US011339851B2

(12) United States Patent
Yu

(10) Patent No.: US 11,339,851 B2
(45) Date of Patent: May 24, 2022

(54) DRAWSTRING LOCK

(71) Applicant: Chun Te Yu, Changhua County (TW)

(72) Inventor: Chun Te Yu, Changhua County (TW)

( * ) Notice: Subject to any disclaimer, the term of this patent is extended or adjusted under 35 U.S.C. 154(b) by 0 days.

(21) Appl. No.: 17/079,092

(22) Filed: Oct. 23, 2020

(65) Prior Publication Data
US 2021/0123501 A1     Apr. 29, 2021

(30) Foreign Application Priority Data

Oct. 25, 2019  (TW) .................... 108138744

(51) Int. Cl.
*F16G 11/10*     (2006.01)
*E05B 37/16*     (2006.01)

(52) U.S. Cl.
CPC ............ *F16G 11/101* (2013.01); *E05B 37/16* (2013.01)

(58) Field of Classification Search
CPC ........ F16G 11/101; F16G 11/14; E05B 37/16; E05B 67/003; E05B 37/02; Y10T 24/3984
See application file for complete search history.

(56) References Cited

U.S. PATENT DOCUMENTS

| | | | |
|---|---|---|---|
| 1,660,040 A * | 2/1928 | Lehtonen | F16G 11/106 24/134 KB |
| 2,226,393 A * | 12/1940 | Seeger | F16G 11/101 24/134 P |
| 2,292,746 A * | 8/1942 | Donald | F16G 11/106 24/134 P |
| 4,022,486 A | 5/1977 | Plaiss | |
| 4,592,116 A * | 6/1986 | Christensen | F16G 11/101 24/115 G |
| 4,594,752 A * | 6/1986 | Garner, Sr. | F16G 11/101 24/132 R |
| 4,881,302 A * | 11/1989 | Lee | F16G 11/101 24/136 R |
| 5,572,770 A * | 11/1996 | Boden | F16G 11/101 24/136 R |
| 5,896,623 A * | 4/1999 | Martin | F16L 3/233 24/16 PB |
| 6,339,867 B1 * | 1/2002 | Azam | A43C 7/08 24/115 G |
| 7,104,093 B2 | 9/2006 | Ling et al. | |
| 2016/0298365 A1 | 10/2016 | Christensen | |

FOREIGN PATENT DOCUMENTS

TW             M266341 U      6/2005

* cited by examiner

*Primary Examiner* — Robert Sandy
*Assistant Examiner* — Louis A Mercado
(74) *Attorney, Agent, or Firm* — Muncy, Geissler, Olds & Lowe, P.C.

(57) ABSTRACT

A drawstring lock includes a housing that allows the two ends of a drawstring to pass through, a stop mechanism disposed on the housing, and a lock mechanism connected to the stop mechanism. The housing is able to shift freely along the drawstring and once reaching its desired position, it is able to operate the stop mechanism so that the housing is stopped and cannot be shifted. Subsequently, the lock mechanism is used to lock the stop mechanism, keeping it secured until the lock mechanism is unlocked.

9 Claims, 18 Drawing Sheets

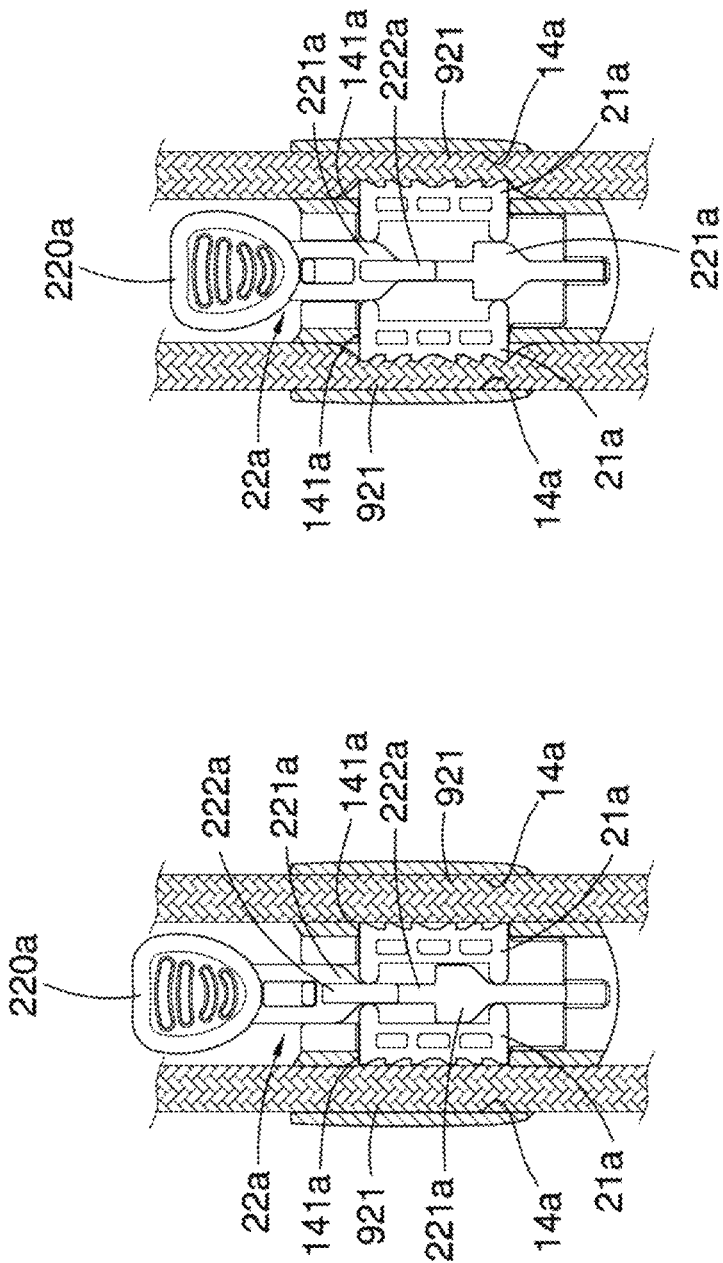

DRAWSTRING LOCK

FIELD OF INVENTION

The present invention relates to a lock, in particular, relates to the drawstring lock that is used to secure a drawstring, the drawstring is commonly used on a drawstring bag for drawing in to secure a bag opening of the drawstring bag.

RELATED PRIOR ART

FIGS. 28 and 29 show a drawstring bag 9, it comprises a bag body 91 and a drawstring 92. The drawstring 92 is normally inserted, threaded or encased within the top rim of the bag opening 910 in order to draw in the material of the bag and secure the bag opening 910. However, the drawstring 92 is commonly secured by a toggle 93, and therefore does not always ensure the drawstring stays in place for bag security. For example, FIGS. 28 and 29 show the toggle positions of the drawstring bag, which shows the bag opening 910 being opened and drawn in. The sliding back and forth of the toggle 93 is able to easily operate the drawstring 92 and the amount of exposure to the bag opening 910, which brings into a security concern as anyone is able to easily slide the toggle 93 of the drawstring and open the bag. Additionally, some drawstring bags even only rely on basic knots instead of toggles to secure the bags, which again is able to easily be undone and therefore defeat the point of securing the bag openings.

In short, the drawstring bags or other of drawstring related items of the prior art all have the same common difficulty in terms of security that are yet to be solved urgently.

SUMMARY OF INVENTION

The present invention discloses a drawstring lock, a drawstring that after it has been locked by the drawstring lock and the drawstring lock would be able to maintain at a drawn in and locked state until it is unlocked. In detail, the drawstring lock of the present invention comprises a housing, a stop mechanism disposed on the housing, and a lock mechanism connected to the stop mechanism. The housing is capable of allowing the two ends of the drawstring to pass through and shift relatively to the housing. The stop mechanism is able to be locked by the lock mechanism so that the stop mechanism is unable to be operated and being released when the stop mechanism is unlocked so the stop mechanism is able to be operated.

In one aspect, the housing of the present invention comprises a first through-hole that is capable of allowing the two ends of the drawstring to enter, and a second through-hole that is capable of allowing the two ends of the drawstring to exit; the stop mechanism comprises a twist portion located within the housing and a twist button that is able to drive the twist portion to rotate; the twist button is unable to drive the twist portion to rotate when the lock mechanism is locked but the twist button is able to be once the lock mechanism unlocked; the twist portion has a channel that allows the two inner portions within the housing of the drawstring to pass through. When the twist portion is located at an original position, the twist portion does not twist the two inner portions of the drawstring so that the drawstring is able to shift relatively to the housing. When the twist portion is twisted to a stopped position from the original position, the twist portion will have twisted the two inner portions of the drawstring so that the two inner portions of the drawstring are unable to shift relatively to the housing.

In another aspect, the twist button of the present invention is rotatably disposed on the housing and engaged to the twist portion so that the twist portion is able to be rotated along with the twist button.

In another aspect, the housing of the present invention has two locking recesses in different location and the lock mechanism is configured on the twist portion and is able to rotate as the twist button and the twist portion rotates. The lock mechanism also comprises a combination lock assembly, a press key, and a lock block; the combination lock assembly is disposed on the top end of the lock mechanism and located within the twist button. The press key is connected to the combination lock assembly and when the correct combination code is dialed, and then the press key is able to be pressed to shift away from a position and be shifted back to the position when released. The lock block is linked to the press key and when the twist portion is located at the original position, the lock block is able to shift in and out of one of the locking recesses of the housing as the press key shifts. When the twist portion is located at the stopped position, the lock block is able to shift in and out of the other locking recess of the housing as the press key shifts.

In another aspect, the housing of the present invention has two through-passages. The two through-passages are capable of allowing the two ends of the drawstring to pass through respectively. The stop mechanism comprises two stop blocks and a push portion, the two stop blocks is able to shift laterally and each respectively located within two side holes of the two through-passages. The push portion is located between the two stop blocks and is able to shift longitudinally for pushing the two stop blocks to restrict the two inner portions of the drawstring. Preferably, the push portion of the present invention has a push block. The push block has two opposite side surfaces that are both inclined surfaces and each respectively faces the two stop blocks.

In another aspect, the lock mechanism of the present invention comprises a combination locking assembly that connects to the push portion. When the combination locking assembly is dialed to the correct combination code, the push portion is then able to be shifted longitudinally. When the combination locking assembly is not dialed to the correct combination code, the push portion is then unable to be shifted.

In another aspect, the housing of the present invention has a back side that has a groove that is capable of storing one of the two outer portions of the drawstring. The push portion has an L-shaped block member and extends from the back side of the housing to block the outer portion of the drawstring in the groove.

In another aspect, the housing of the present invention has a main casing and two swing arms pivoted on the main casing. The two swing arms are able to swing relatively to the main casing to and unfolded position and a folded position. Each swing arm has a through-passage and a side hole that communicates; the two through-passages are capable of each allowing the respective two ends of the drawstring to pass through. The stop mechanism comprises two stop blocks and a pin portion, the two stop blocks are secured onto the two opposite side surfaces of the main casing. Each of the stop blocks respectively faces the two side holes of the two swing arms. The pin portion is connected to the lock mechanism and is able to shift longitudinally, in which, the pin portion further comprises two blocking pins. The two blocking pins are able to each respectively be inserted into or retracted from two pin holes on the two swing arms.

In another aspect, the lock mechanism of the present invention comprises a combination locking assembly that is connected to the pin portion. When the combination locking assembly is dialed the correct combination code, the pin portion is then able to shift longitudinally. When the combination locking assembly is not dialed the correct combination code, the pin portion is unable to be shifted.

In comparison to the prior arts, the drawstring lock of the present invention is able to lock the drawstring in a drawn in and secured state, only allowing authorized users to shift and operate the drawstring lock to a locked or an unlocked state. Thus, the drawstring lock of the present invention is able to maximize and solve the existing problems/difficulties in the security of drawstring bags or other of drawstring related items of the prior arts

BRIEF DESCRIPTION OF DRAWINGS

The present invention will be described via detailed illustration of the preferred embodiment referring to the drawings wherein:

FIGS. 18 and 19 are partial cross-sectional view of the second preferred embodiment of the present invention in an original state and a stopped state;

DETAILED DESCRIPTION OF PREFERRED EMBODIMENT

Figure 1:
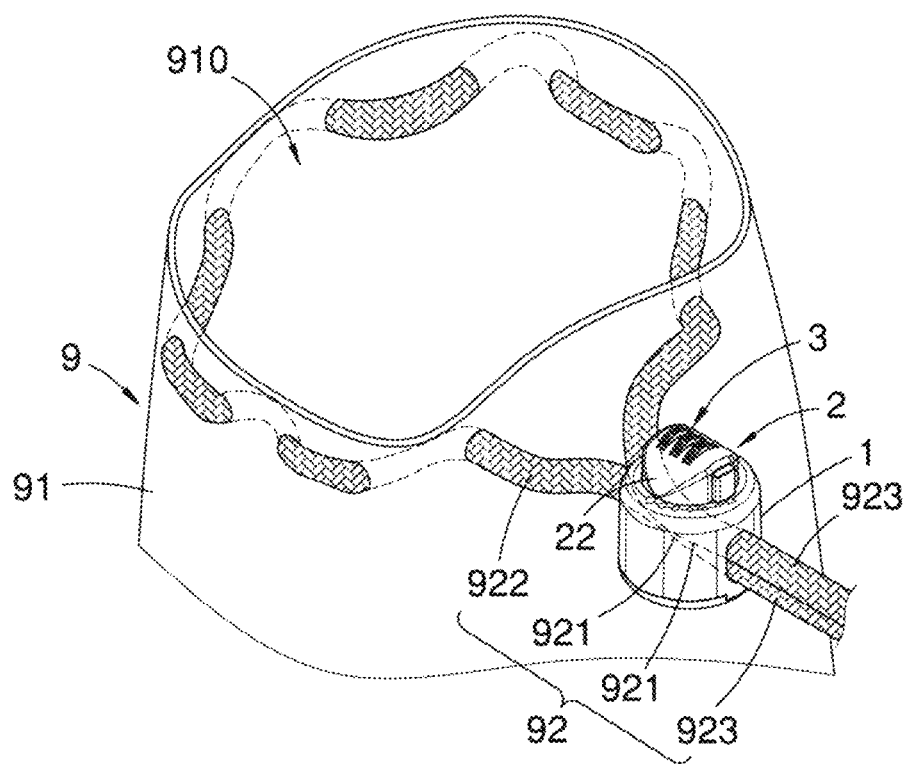
FIG. 1 is a first preferred embodiment of the present invention used in a drawstring bag 9.

Referring to FIG. 1, it shows the drawstring lock of a first preferred embodiment of the present invention used in a drawstring bag 9, the drawstring lock comprises a housing 1, a stop mechanism disposed on the housing, and a lock mechanism 3 connected to the stop mechanism 2. In the first preferred embodiment, the drawstring lock of the present invention is used for securing and releasing a drawstring 92, the drawstring 92 is inserted in the top rim of a bag opening 910 of the bag body 91 of the drawstring bag 9. Also, once the two ends of the drawstring 92 have passed through the housing 1, the drawstring 92 will comprise two inner portions 921 within the housing 1, a looped section 922 that formed a closed loop with the housing 1 and located outside of the housing 1, and the two outer portions 923 passing out of the housing 1. The two front ends of the two inner portions 921 are the extension of the two back ends of the looped section 922, the two front ends of the two outer portions 923 continues to the two tail ends of the two inner portions 921, so that the two terminal ends of the two outer portions 923 then commonly forms into a blocking portion (not shown) or fixed onto an object. Take the drawstring bag 9 as an example, the blocking portion commonly has decorative purposes such as a knot, a pearl or a tassel accessory. This is able to prevent the housing 1 to fall off from the two terminal ends of the two outer portions 923.

Figure 2:
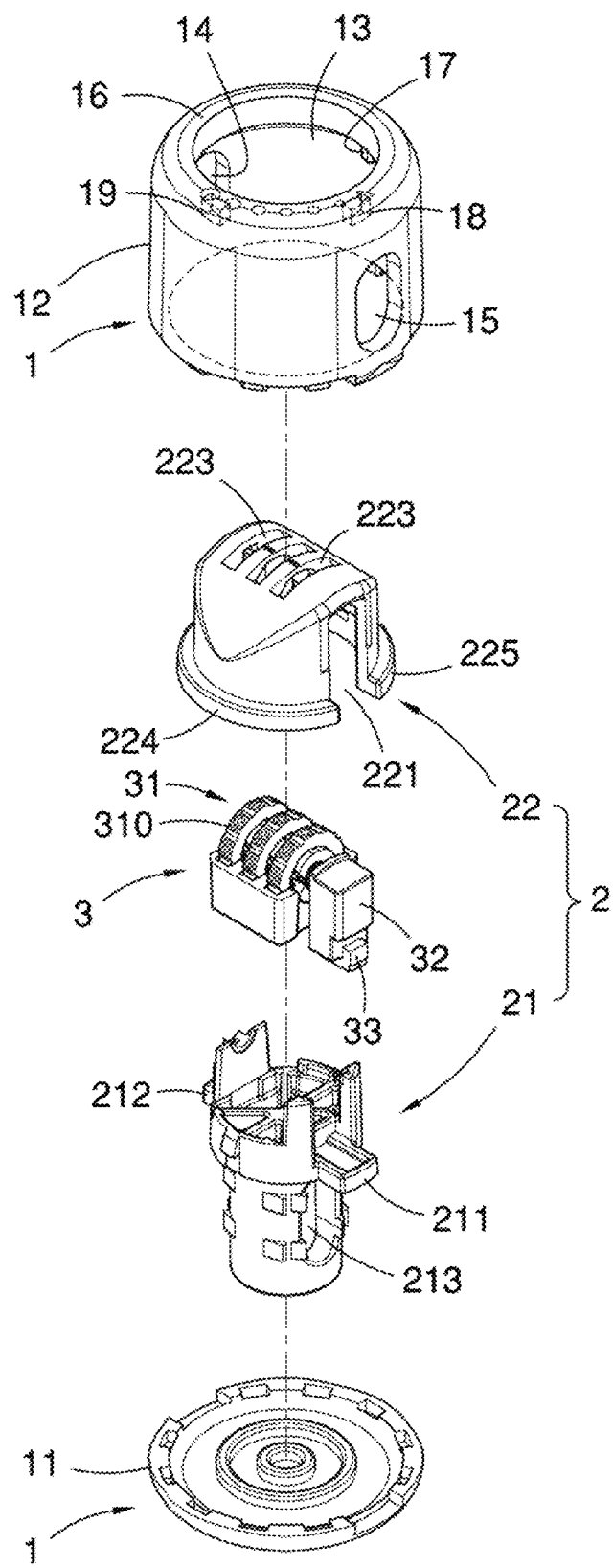
FIGS. 2 and 3 are perspective exploded views of the first preferred embodiment of the present invention from different angles.

Referring to FIG. 2, it shows that the housing 1 having a first through-hole 14 and a second through-hole 15. The first through-hole 14 is capable of allowing the two ends of the drawstring 92 to enter; the second through-hole 15 is capable of allowing the two ends of the drawstring 92 to exit. In the first preferred embodiment, the housing 1 comprises a bottom cover 11, a body 12 that is hollow, the bottom cover 11 covers a bottom surface of the body 12, a top surface of the body 12 has an opening 13, all of the side surfaces of the body 12 have formed a plurality of protruding surfaces (an alternative of coarse or knurled surfaces can also be viable) and not smooth so the grip onto the body 12 is easier. In which, the opening 13 faces the bottom cover 11, the first through-hole 14 is located on a side surface of the body 12, the second through-hole 15 is located on the other side surface of the body 12. The first through-hole 14 and the second through-hole 15 are directly opposed to each other but are also able to be staggered.

Figure 3:
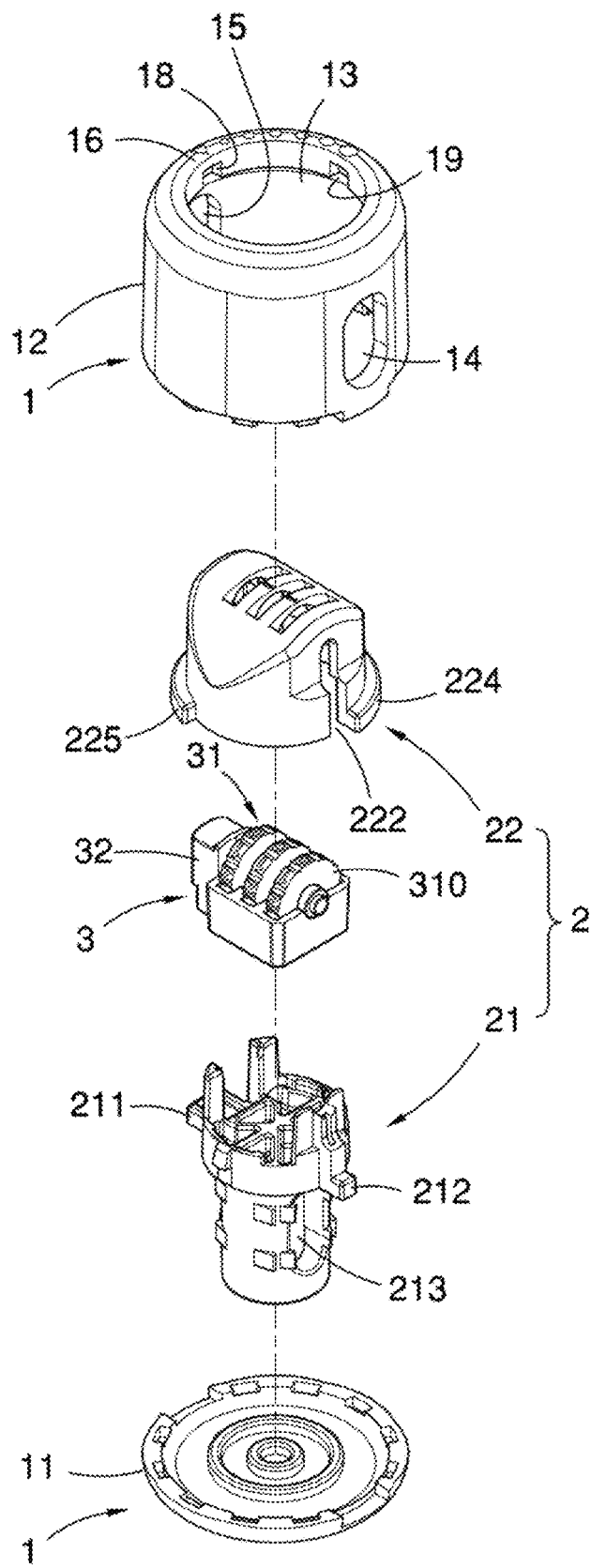
Figure 4:
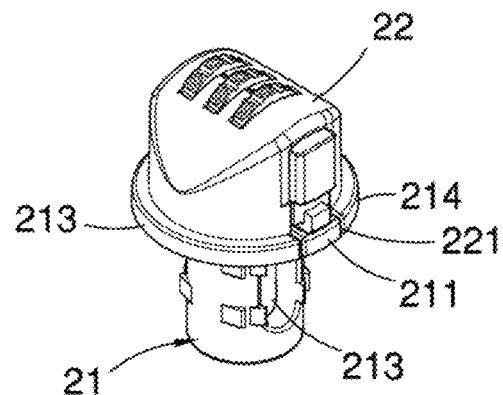
FIGS. 4 and 5 are perspective views of the stop mechanism at different angles in the first preferred embodiment of the present invention.
Figure 5:
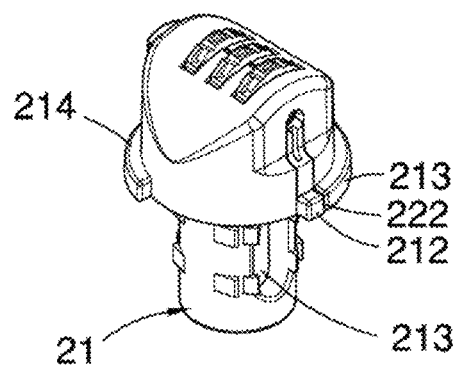
Figure 6:
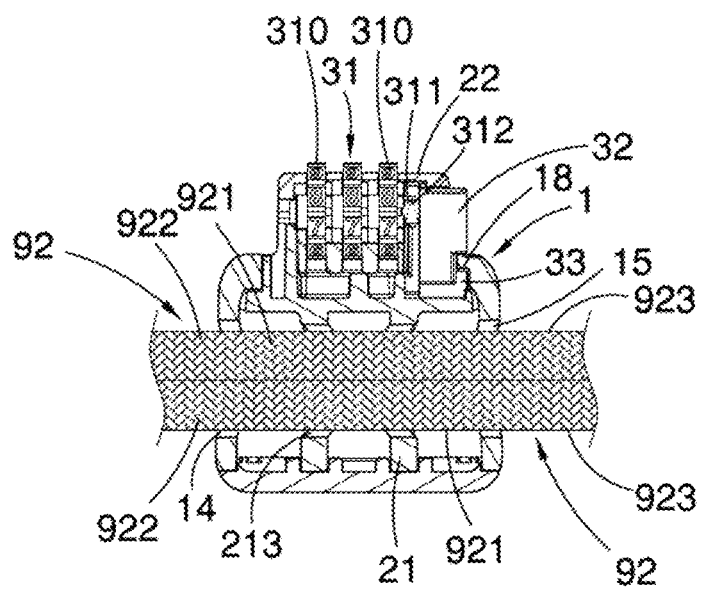
FIGS. 6-8 are cross-sectional views of different positions when the twist portion 21 of the first preferred embodiment of the present invention is in an original position.
Figure 7:
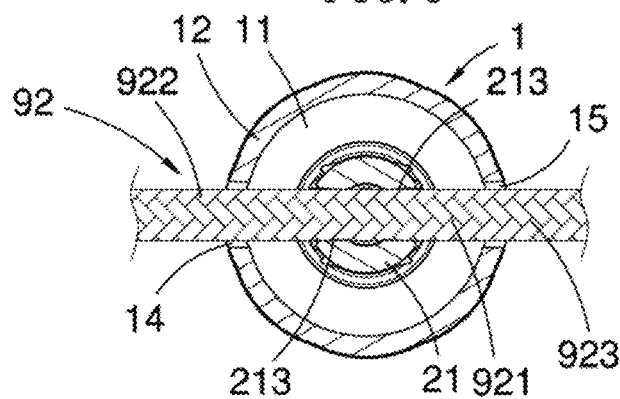

The stop mechanism 2 comprises a twist portion 21 located within the housing 1 and a twist button 22 that is able to drive the twist portion 21 to rotate. The twist portion 21 has a channel 213 that passes through; the channel 213 is capable of allowing the two inner portions 921 of the drawstring 92 to pass through. Referring to FIGS. 2 and 3, in the first preferred embodiment, the twist button 22 is rotatably disposed in the housing 1 and exposing a portion of it from the opening 13 of the housing 1 for operation. The twist button 22 also has a portion that is engaged to an end of the twist portion 21. In detail, the twist button 22 has two notches 221 and 222, the twist portion 21 has a blocking block 211 corresponding to one of the notches 221, there is also another blocking block 212 corresponding to the other notch 222. Referring to FIGS. 4 and 5, when the twist button 22 is combined to the twist portion 21, the two blocking blocks 211 and 212 are respectively slotted into the two notches 221 and 222 and forming into the aforementioned engaged state. As the result, the twist button 22 is then able to drive the twist portion 21 to rotate. However, the linkage mechanism between the twist button 22 and the twist portion 21 is not limited to the aforementioned method. For example, this linkage mechanism is also able to be changed to a method of driving the twist portion 21 to rotate by pressing the twist button 22 downward.

Figure 8:
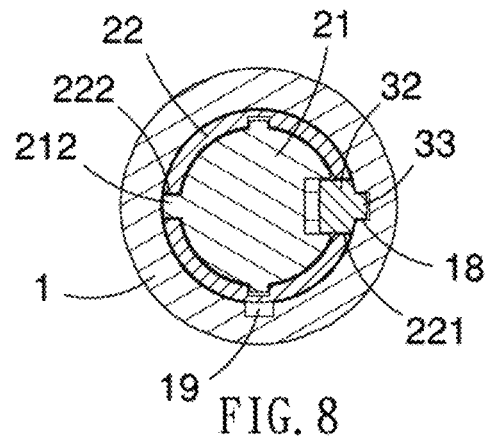
Figure 12:
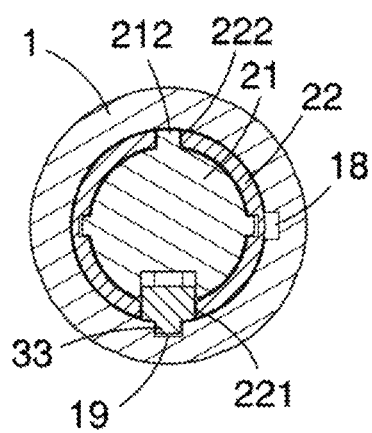

Referring to FIGS. 2 and 3, the lock mechanism 3 is connected to the stop mechanism 2 for securing and releasing the stop mechanism 2. In the first preferred embodiment, the lock mechanism 3 is configured on the twist portion 21 and is able to rotate as the twist portion 21 rotates. In more detail, the lock mechanism 3 comprises a combination locking assembly 31, a press key 32, and a lock block 33. The combination locking assembly 31 is disposed on a top end of the twist portion 21 and located within the twist button 22; the press key 32 is connected to the combination locking assembly 31 and exposed from the notch 221 of the twist button 22. As commonly known, the combination locking assembly 31 comprises a plurality of dials 310, a shifting spindle 311, and a spring 312. The plurality of dials 310 are exposed from a plurality of holes 223 on the twist button 22, the shifting spindle 311 is moveably inserted into the plurality of dials 310, the spring 312 enables the shifting spindle 311 to shift elastically. When the plurality of dials 310 of the combination locking assembly 31 is dialed to the correct combination code, the shifting spindle 311 is then able to be shifted elastically. On the other hand, when the plurality of dials 310 is not dialed to the correct combination code, the shifting spindle 311 is then unable to be shifted. Since the twist button 22 is fixed to one end of the shifting spindle 311 of the combination locking assembly 31, therefore, when the correct combination code is dialed for the combination locking assembly 31, the press key 32 is then able to be easily pressed out of a position and return back to the position when it is released (when the press key 32 is not pressed). As the lock block 33 is fixed to the press key 32, the shift is able to be linked to the press key 32 and the lock block 33 is disposed to correspond to the two locking recesses 18 and 19 at different positions on the housing 1. Therefore, when the twist portion 21 is located at an original position as shown in FIG. 8, the lock block 33 is able to be shifted in and out of one of the locking recesses 18 in the housing 1 as the press key 31 shifts. When the twist portion 21 is located at the stopped position as shown in FIG. 12, the lock block 33 is able to be shifted in and out of the other locking recess 19 of the housing 1 as the press key 31 shifts.

Referring to FIGS. 1, and 6-8, the twist button 22 and the twist portion 21 are both in an original position. At this time, the lock block 33 is slotted in the locking recess 18, the channel 213 on the twist portion 21 is aligned with the first through-hole 14 and the second through-hole 15, the two ends of the drawstring 92 passes into the housing 1 through the first through-hole 14 and continues to pass through the channel 213 on the twist portion 21, then passes through the second through-hole 15 and to the outside of the housing 1. As the two inner portions 921 of the drawstring 92 have not been twisted by the twist portion 21, the housing 1 is able to therefore be shifted relatively to the two inner portions 921 of the drawstring 92. In other words, the housing 1 is able to be shifted forward and backward freely along the drawstring 92 at this time and subsequently adjust the drawstring 92 and its ability to draw in and secure the bag opening 910 of the drawstring bag 9. This also demonstrates how the drawstring 92 has changed its form from a looped section into a closed loop (effectively adjusting the bag opening 910).

Figure 9:
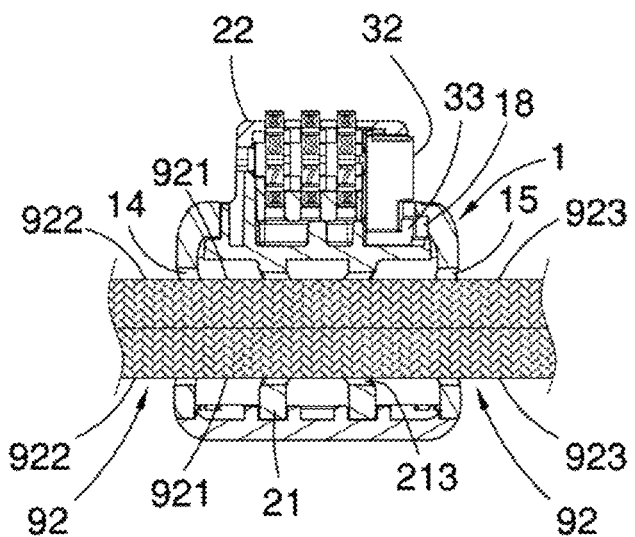
FIG. 9 is a cross-sectional view of the first preferred embodiment of the present invention after the press key 32 is pressed.
Figure 10:
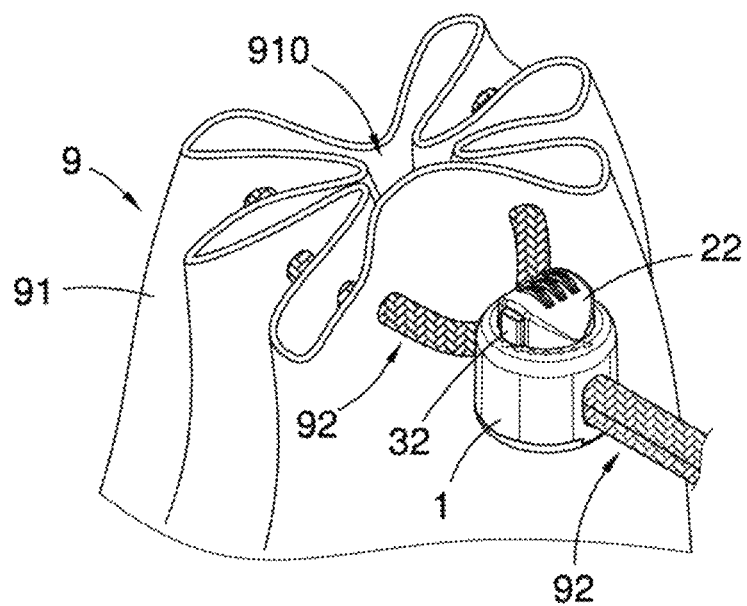
FIGS. 10-12 are cross-sectional views of different positions when the twist button 22 of the first preferred embodiment of the present invention is in a stop position.
Figure 11:
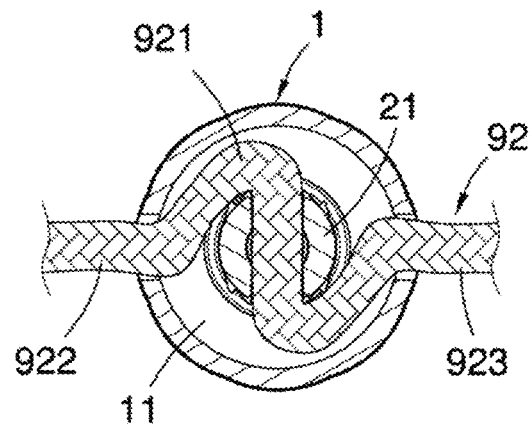

When the combination locking assembly 31 is dialed to the correct combination code so that the press key 32 is able to be pressed, the lock block 33 is able to be shifted away from the locking recess 18 when the press key 32 is pressed as shown in FIG. 9; at this moment, the twist button 22 is in a rotatable state. When the twist button 22 is rotated to a predetermined angle (such as 90 degrees) and rotates the twist portion 21 along with it, the twist portion 21 will be shifted from the original position to a stopped position as shown in FIGS. 10-12 and subsequently twists the two inner portions 921 of the drawstring 92 to a multi-turned state as shown in FIG. 11, which causes the two inner portions 921 unable to be shifted relatively to the housing 1. As of now, no matter it is pulling or tugging the two outer portions 923 or the looped section 922 of the drawstring 92, the two inner portions 921 of the drawstring 92 is unable to be shifted relatively to the housing 1. In which, as the entire lock mechanism 3 is able to be rotated along with the twist portion 21, once the twist portion 21 is shifted to a stopped position, the lock block 33 will follow and shift to the position of the other locking recess 19 and using the elasticity of the spring 312 to automatically be slotted into the locking recess 19 as shown in FIG. 12. At this moment, once the combination locking assembly 31 is not dialed to the correct e combination code, the combination locking assembly 31 will enter into a locked state and therefore, the press key 32 will not be able to be pressed and causing the lock block 33 to continue to be slotted in the locking recess 19 and the twist button 22 is unable to be rotated back to the original position, therefore so does the twist portion 21. This means that the entire stop mechanism 2 is locked by the lock mechanism 3 and unable to be operated, in which, the stop mechanism 2 will remained at a stopped state where the two inner portions 921 of the drawstring 92 is unable to be shifted relatively to the housing 1 until the lock mechanism 3 is disabled and unlocked. This also means that a correct combination code has to be dialed on the combination locking assembly 31 until the lock mechanism 3 is able to be disabled and unlocked. Once the correct combination code is dialed, the press key 32 is then able to be pressed and subsequently release the lock block 33 from the locking recess 19 so that the stop mechanism 2 is able to be reverted to its operable state. Then, as long as the twist button 22 is reversed back to a predetermined angle (e.g. 90 degrees), the twist portion 21 will follow and rotate back to the original position and allow the two inner portions 921 of the drawstring 92 to untwist from the multi-turned state by the twist portion 21 so that the housing 1 is able to be shifted freely along the drawstring 92.

Referring to FIGS. 2 and 3, in the first preferred embodiment, the housing 1 also comprises a ring collar 16 that surrounds the opening 13, two arc rims 224 and 225 are formed where the twist button 22 corresponds to the ring collar 16. When the twist button 22 is configured onto the housing 1, the ring collar 16 of the housing 1 is able to block the two arc rims 224 and 225 of the twist button 22 so that the twist button 22 is unable to fall out of the opening 13 of the housing 1.

Figure 13:
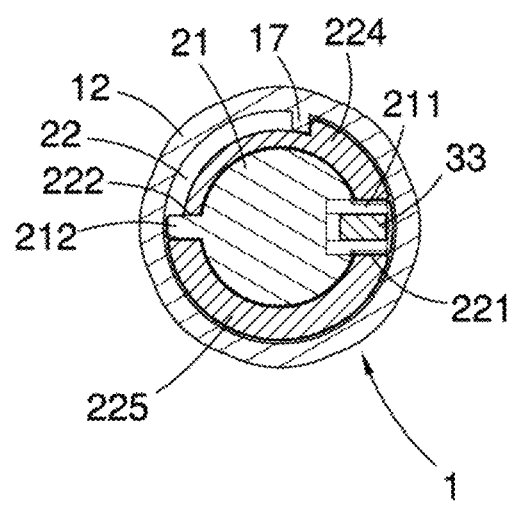
FIGS. 13 and 14 are cross-sectional views of the twist button 22 of the first preferred embodiment when it is restricted by a limiting block 17 in the original position and the stop position.
Figure 14:
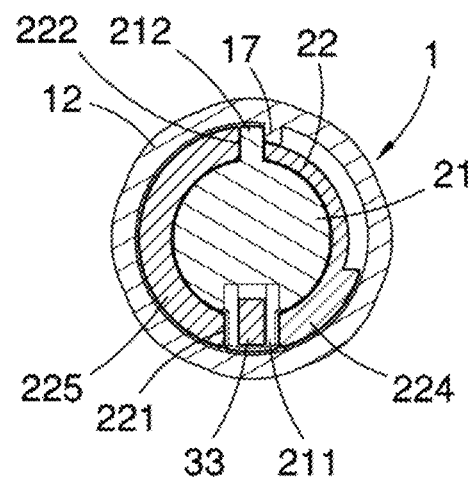

Preferably, the housing 1 also comprises a limiting block 17 disposed under the ring collar 16 used to limit the twisting angle of the twist button 22. When the twist button 22 and the twist portion 21 are located at the original position as shown in FIG. 13, a side of the limiting block 17 is blocking an end of one of the arm rims 224, and when the twist button 22 and the twist portion 21 are rotated to the stopped position as shown in FIG. 14, the other side of the limiting block 17 is blocking an end of the other arc rim 225 on the blocking block 212.

Figure 15:
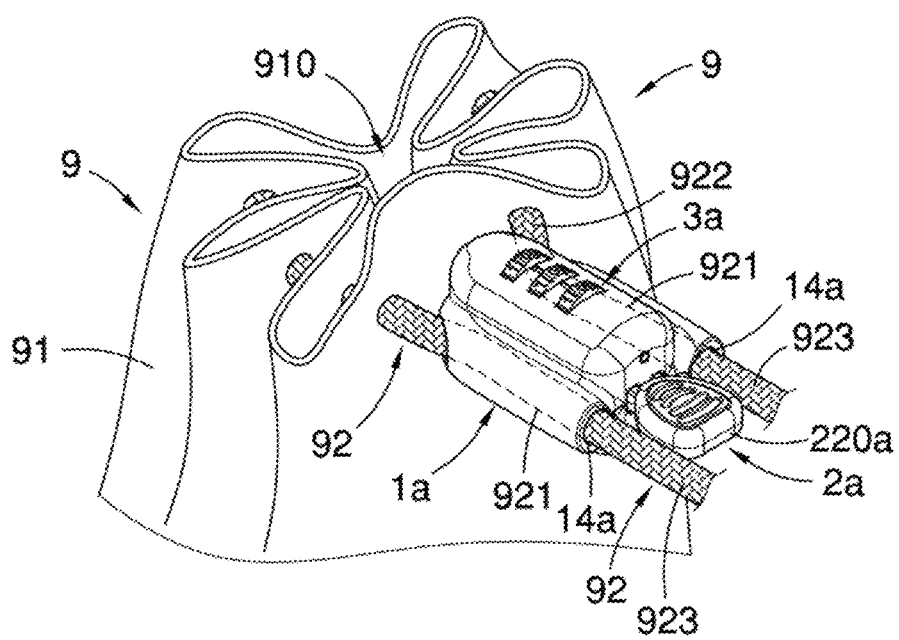
FIG. 15 is a second preferred embodiment of the present invention used in a drawstring bag 9.
Figure 16:
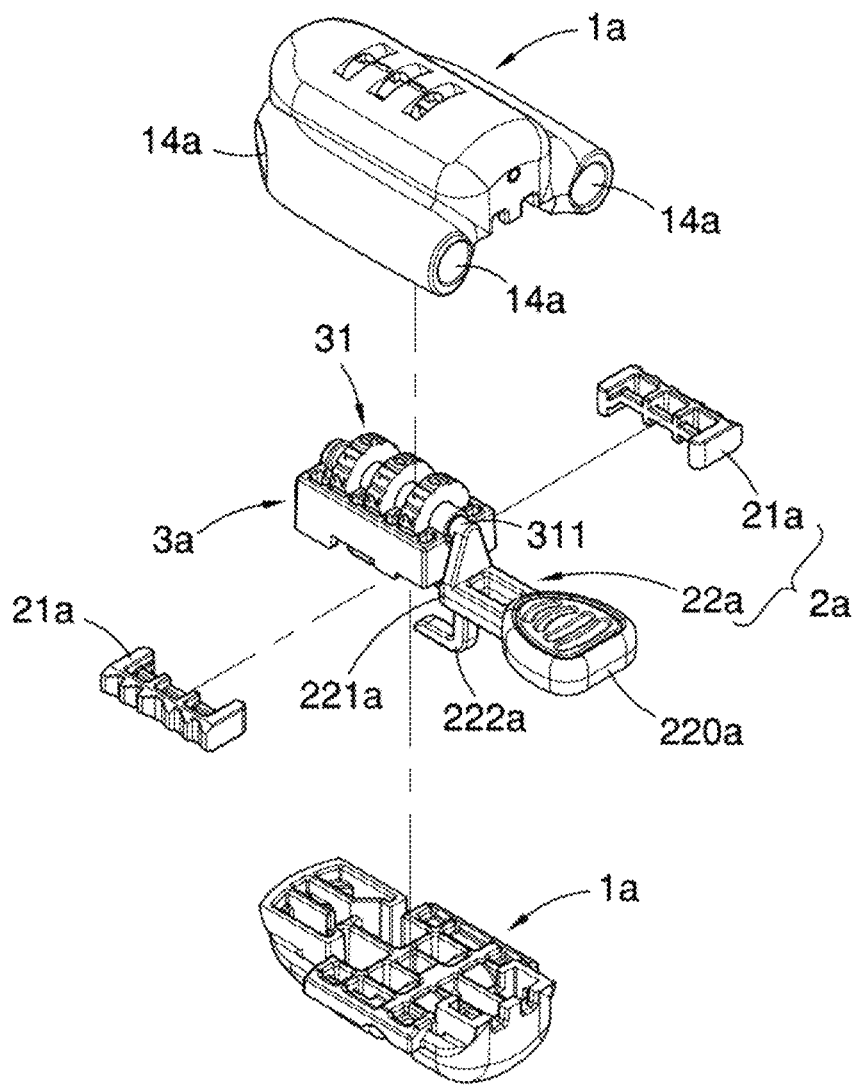
FIGS. 16 and 17 are perspective exploded views of the second preferred embodiment of the present invention from different angles.

Referring to FIG. 15, it shows the drawstring lock of a second preferred embodiment of the present invention, wherein it comprises a housing 1a, a stop mechanism 2a disposed on the housing 1a, and a lock mechanism 3a connected to the stop mechanism 2a. The housing 1a is able to also allow the two ends of the drawstring 92 to pass through, so that the drawstring 92 comprises two inner portions 921 within the housing 1a, a looped section 922 that forms into a closed loop with the housing 1a and located outside of the housing 1a, and two outer portions 923 passing out of the housing 1a after the two ends of the drawstring 92 passes through the housing 1a. Referring to FIG. 16, in the second preferred embodiment, the housing 1a has two through-passages 14a that parallels the two ends of the drawstring 92 each respectively pass through the two through-passages 14a.

Figure 17:
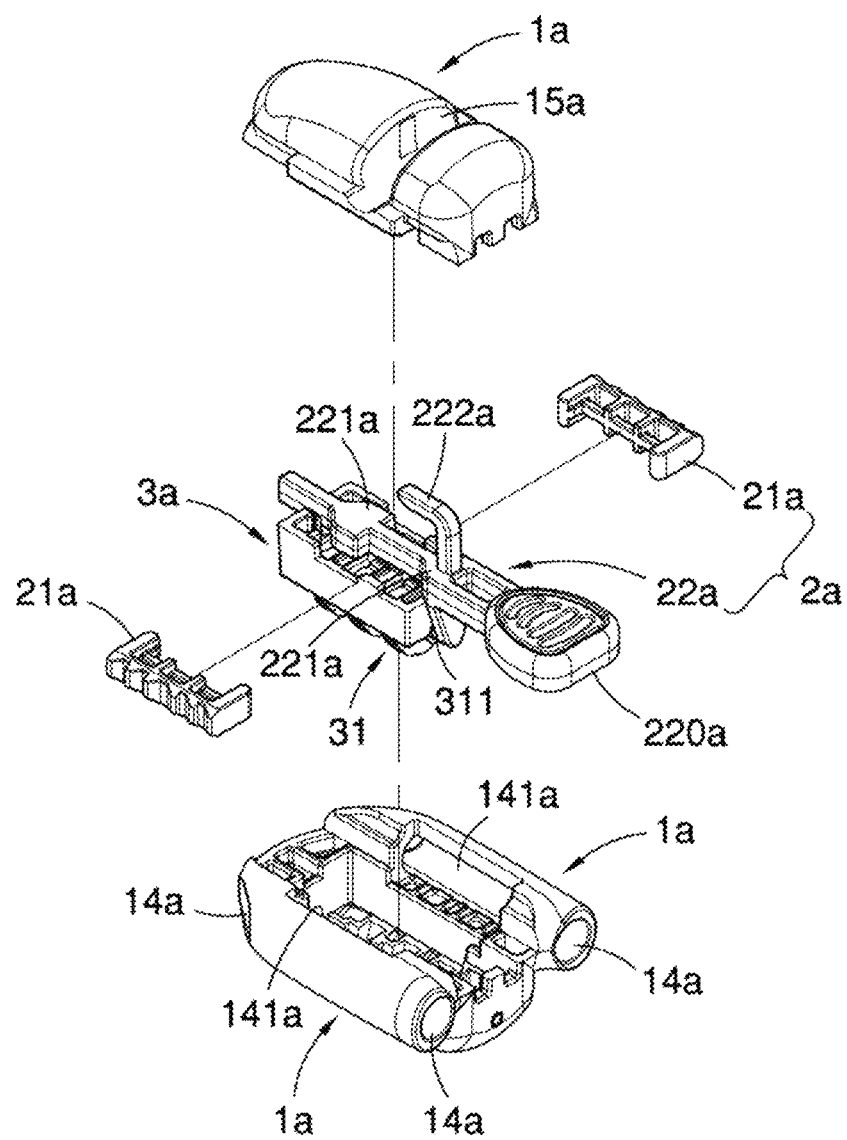
Figure 20:
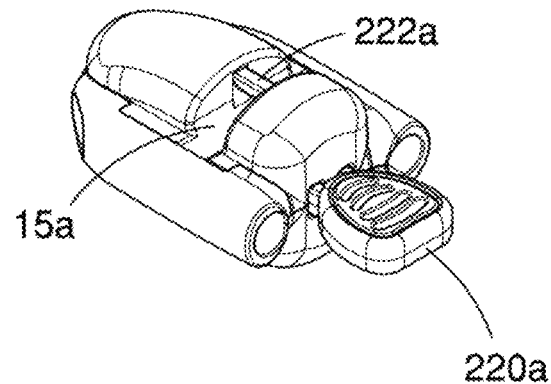
FIG. 20 is a perspective view of the second preferred embodiment of the present invention.

Referring to FIGS. 16 and 17, the stop mechanism 2a comprises two stop blocks 21a and a push portion 22a. The two stop blocks 21a is able to be shifted laterally and each respectively located within two side holes 141a of the two through-passages 14a. The push portion 22a is located between the two stop blocks 21a and is able to be shifted longitudinally. The push portion 22a also comprises two push blocks 221a that are aligned along the shifting direction. Alternatively, the push portion 22a is also able to dispose a push block 221a. The two opposite side surfaces of the push block 221a are both inclined surfaces and each respectively faces the two stop blocks 21a.

The lock mechanism 3a is able to be the same combination locking assembly 31 used in the first preferred embodiment. An end of the shifting spindle 311 of the combination locking assembly 3 is fixed to the push portion 22a. Therefore, when the combination locking assembly 31 is dialed the correct combination code, the push portion 22a is then able to be shifted longitudinally, at this moment, a handle 220a of the push portion 22a is able to be pushed or pulled so that the push portion 22 is able to be shifted back and forth on a vertical direction. On the other hand, when the combination locking assembly 31 is not dialed the correct combination code, the push portion 22a then is unable to be shifted, the handle 220a is unable to be pushed or pulled at this moment, in another words, the stop mechanism 2a is locked by the lock mechanism 3a.

Referring to FIG. 18, when the push portion 22a is located at an original position, the two stop blocks 21a have not been pushed by the push portion 22a. At this moment, the two stop blocks 21a are located at an original position and have not been pushed to restrict the two inner portions 921 of the drawstring 92. This means that the housing 1a is able to be shifted relatively to the two inner portions 921. When the combination locking assembly 31 is dialed to the correct combination code and permitting the push portion 22a to be shifted, the handle 220a located on the outside of the housing 1a only has to be pushed to shift the position of the push portion 22a from the original position to a stopped position as shown in FIG. 19. At this moment, the two stop blocks 21a are restricted by the two push block 221a of the push portion 22a and each respectively be shifted towards the two inner portions 921 to a position that restricts the two inner portions 921. As the result, the housing 1a is unable to be shifted relatively to the two inner portions 921. Furthermore, when the combination locking assembly 31 is not dialed to the correct combination code, the handle 220a will not be able to be pulled outwards. This means that the two inner portions 921 are restricted by the two stop blocks 21a and is unable to be shifted relatively to the housing 1a (i.e. locked state). The locked state will continue until the combination locking assembly 31 is dialed the correct combination code. Once the combination locking assembly 31 is dialed the correct combination code, the handle 220a is able to then be pulled outwards so that the push portion 22a is reverted back to the original position as shown in FIG. 18. At this moment, the two inner portions 921 will be reverted back to the original state of shifting relatively to the housing 1a.

Figure 21:
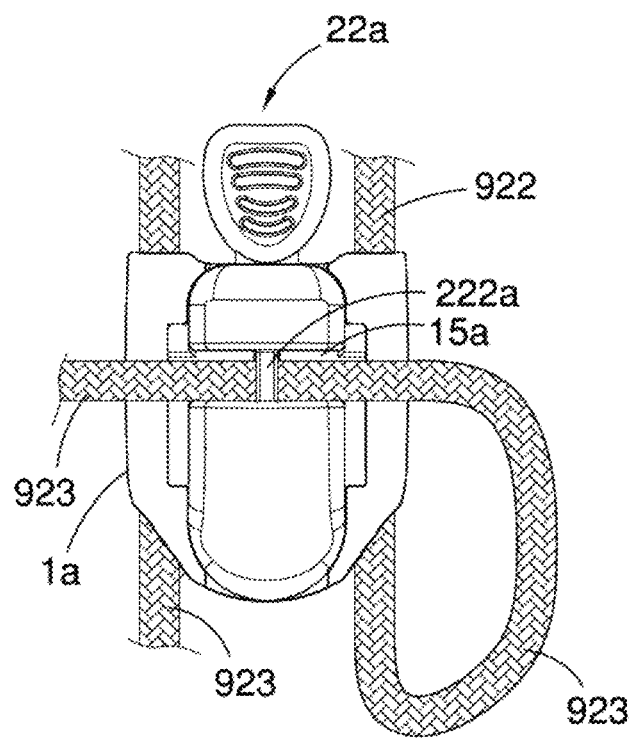
FIG. 21 is a plan view of the second preferred embodiment of the present invention when an outer portion 923 of the drawstring 92 is stored.

Referring to FIGS. 16 and 17, the push portion 22a also comprises an L-shaped block member 222a; the L-shaped block member 22a extends from a back surface of the housing 1a. When the push portion 22a is located at the original position as shown in FIG. 18, the L-shaped block member 222a does not block a groove 15a formed on the back surface of the housing 1a. And when the push portion 22a is located at the stopped position as shown in FIG. 19, the L-shaped block member 222a does block the groove 15a. Referring to FIG. 21, the groove 15a is used to store a portion of one of the two outer portions 923 of the drawstring 92, and using the L-shaped block member 222a to restrict the abovementioned portion of the two outer portions 923 so that the portion will not fall out of the groove 15a.

Figure 22:
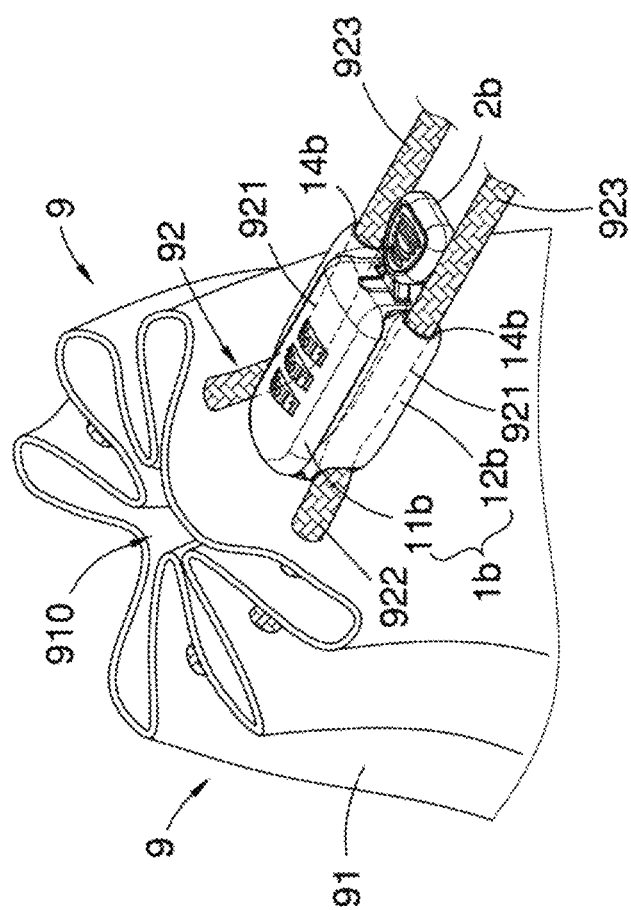
FIG. 22 is a third preferred embodiment of the present invention used in a drawstring bag 9.
Figure 23:
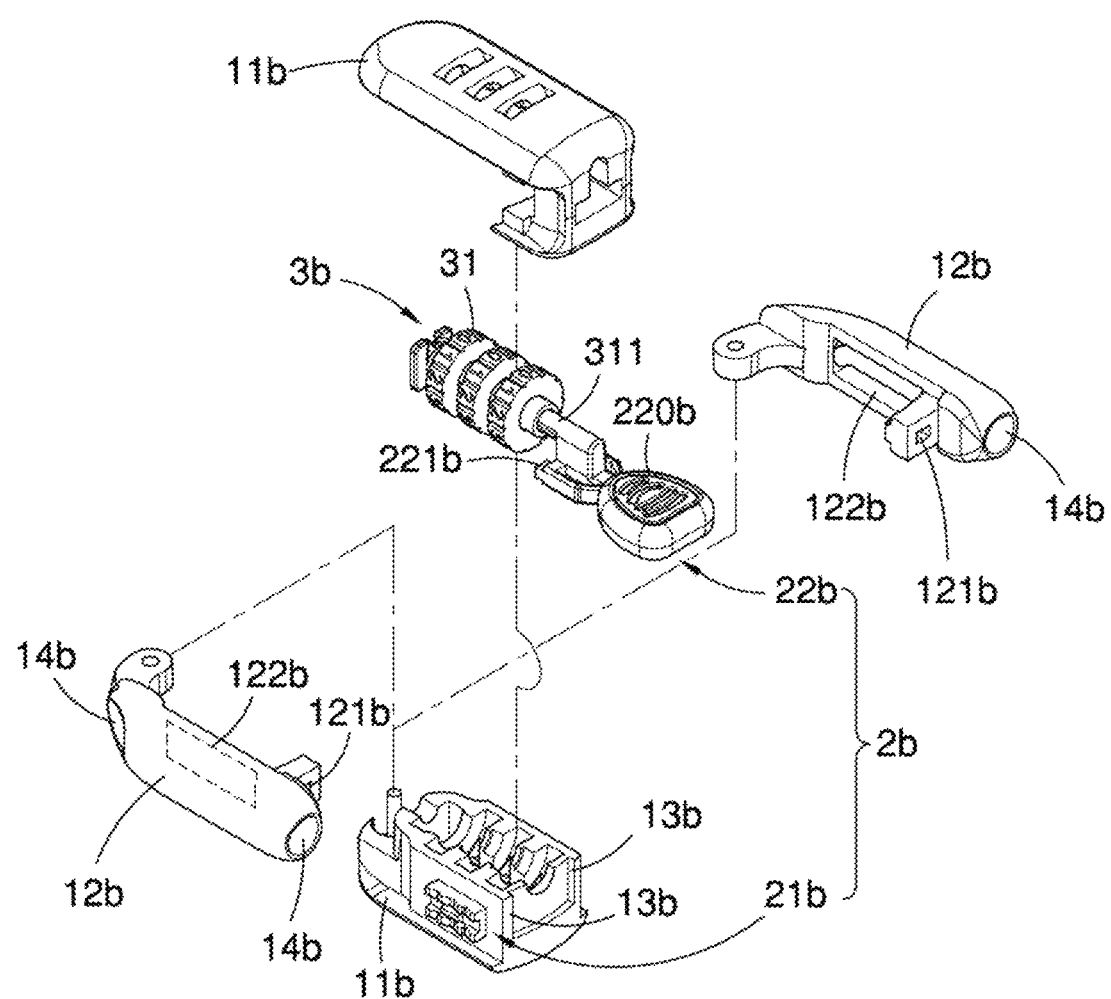
FIG. 23 is a perspective exploded view of the third preferred embodiment of the present invention.
Figure 24:
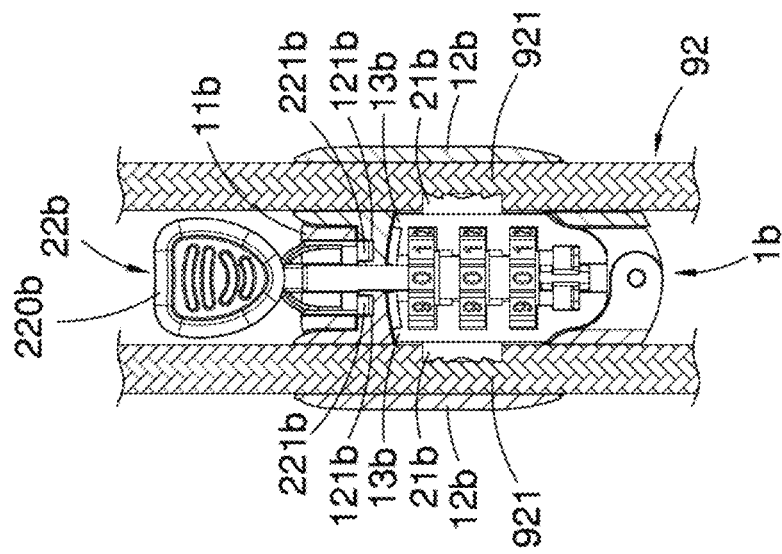
FIGS. 24 and 25 are partial cross-sectional views of the third preferred embodiment of the present invention in an original state and a stopped state.

Referring to FIG. 22, it shows the drawstring lock of a third preferred embodiment of the present invention, wherein it comprises a housing 1b, a stop mechanism 2b disposed on the housing 1b, and a lock mechanism 3b connected to the stop mechanism 2b. The housing 1b is able to allow the two ends of the drawstring 92 to pass through, so that the drawstring 92 comprises the two inner portions 921 within the housing 1b, a looped section 922 that forms into a closed loop with the housing 1b and located outside of the housing 1b, and two outer portions 923 passing out of the housing 1b after the two ends of the drawstring 92 passes through the housing 1b. As shown in FIG. 23, in the third preferred embodiment, the housing 1b comprises a main casing 11b and two swing arms 12b pivoted on the main casing 11b. The two swing arms 12b are able to swing relatively to the main casing 11b. Referring to FIG. 24, it shows the two swing arms 12b located at an unfolded position, referring to FIG. 25; it shows the two swing arms 12b located at a folded position. Referring to FIG. 23, the two swing arms 12b each has a through-passage 14b and a side hole 122b that communicates. The two through-passages 14b are able to each allow the respective two ends of the drawstring 92 to pass through.

Referring to FIGS. 23 and 24, the stop mechanism 2b comprises two stop blocks 21b and a pin portion 22b. The two stop blocks 21b are secured onto the two opposite side surfaces of the main casing 11b and each respectively facing the two side holes 122b of the two swing arms 12b. The pin portion 22b is connected to the lock mechanism 3b and is able to be shifted longitudinally. The pin portion 22b also comprises two blocking pins 221b, the two blocking pins 221b are able to be inserted into or retracted from two pin holes 121b on the two swing arms 12b respectively.

The lock mechanism 3b is able to be the same combination locking assembly 31 used in the first preferred embodiment. An end of the shifting spindle 311 of the combination locking assembly 31 is connected to the pin portion 22b. As the result, when the combination locking assembly 31 is dialed the correct combination code, the pin portion 22b is then able to be shifted longitudinally. At this moment, a handle 220b of the pin portion 22b is able to be pushed or pulled so that the pin portions 22b shifts forward and backward along a vertical direction. Conversely, when the combination locking assembly 31 is not dialed the correct combination code, the pin portion 22b is unable to be shifted. At this moment, the handle 220b is unable to be pushed or pulled, in other words, the stop mechanism 2b is locked by the lock mechanism 3b.

Figure 25:
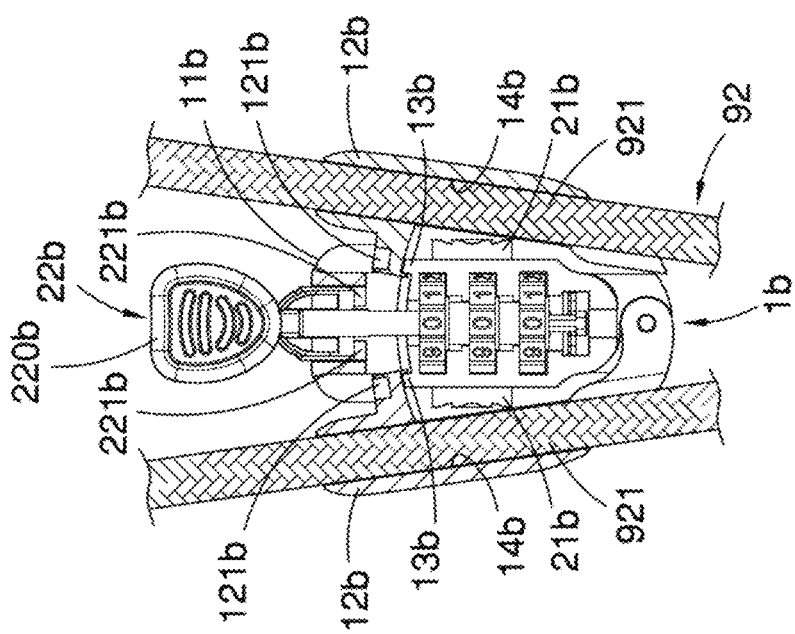

Referring to FIG. 24, when the pin portion 22b is located at an original position, the two swing arms 12b are in an unfolded state so that the two inner portions 921 of the drawstring 92 are not restricted by the two stop blocks 21b. In which, the housing 1b is able to be shifted relatively to the two inner portions 921 at this time, meaning, the housing 1b is able to be shifted back and forth along the drawstring 92. When the combination locking assembly 31 is dialed the correct combination code and permitting the pin portion 22b to be shifted, as long as the two swing arms 12b are folded beforehand, the handle 220b located outside of the housing 1b is able to be pushed so that the pin portion 22b shifts from the original position to a stopped position as shown in FIG. 25. At this moment, two blocking pins 221b of the pin portion 22b are each respectively inserted into the two pin holes 121b on the two swing arms 12b so that the two swing arms 12b is unable to be unfolded. Wherein, when the two swing arms 12b are folded, the two inner portions 921 of the two swing arms 12b are each respectively restricted by the two stop blocks 21b so that the housing 1b is unable to be shifted relatively to the two inner portions 921. Meaning, the housing 1b is unable to be shifted back and forth along the drawstring 92. Then, once the combination locking assembly 31 is not dialed the correct combination code, the pin portion 22b will then unable to be pulled out. This means the two inner portions 921 are restricted by the two stop blocks 21b and is unable to shift the housing 1b relatively, which means the stopped state will remained until the correct combination code is dialed. Once the combination locking assembly 31 is dialed the correct combination code, the handle 220b is then able to be pulled out so that the pin portion 22b is reverted back to the original position as shown in FIG. 24. At this moment, the two swing arms 12b are unfolded so that the two stop blocks 21 no longer restricts the two inner portions 921. The housing 1b is then able to be reverted to the original state of able to be shifted relatively to the two inner portions 921.

The abovementioned lock mechanism 3, 3a, and 3b are able to all adopt a press key locking assembly to replace the abovementioned combination locking assembly 31. Preferably, the abovementioned lock mechanism 3, 3a, and 3b are able to also adopt a double lock core mechanism, the double lock core mechanism comprises two lock cores that are able to independently lock or release the abovementioned stop mechanism, or comprises two lock cores that are able to be coordinately locked or released the abovementioned stop mechanism, the two lock cores are able to both be of combination locking assemblies or key lock assemblies, or one lock core being a combination locking assembly, and the other as a key lock assembly.

From the descriptions above, the housing 1, 1a, or 1b of the drawstring lock of the present invention are able to all allow the two ends of the drawstring 92 to pass through, as well as be shifted back and forth along the drawstring 92 to adjust the size of the looped section 922 of the drawstring 92 into a closed loop (effectively adjusting the bag opening 910 level). Also, once the housing 1, 1a, or 1b reaches its desired position, the stop mechanism 2, 2a, or 2b is then able to operate them into a stopped state so that the two inner portions 921 of the drawstring 92 is unable to be shifted relatively to the housing 1, 1a, or 1b. Then, once the lock mechanism 3, 3a or 3b are locked that subsequently locks the stop mechanism 2, 2a, or 2b at their stopped state, the drawstring 92 will then maintain its drawn in and closed loop state. At this moment, no one but an authorized user would be able to shift and operate the position of the housing 1, 1a or 1b of the drawstring lock.

Thus, the drawstring lock of the present invention is able to maximize the security and solve the existing difficulties in the drawstring bags or other of drawstring related items of the prior arts.

Figure 26:
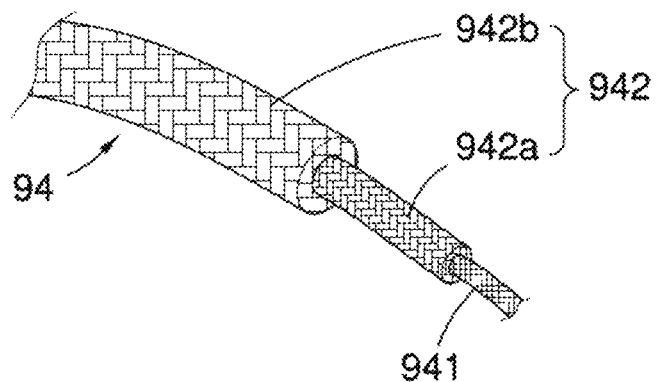
FIG. 26 is a partial perspective cross-sectional view of a drawstring 94 that is capable of passing through one of the present invention.
Figure 27:
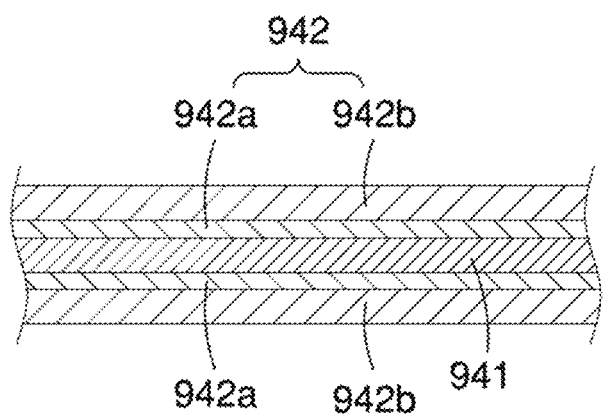
FIG. 27 is a partial cross-sectional view of the drawstring 94 of the present invention.
Figure 28:
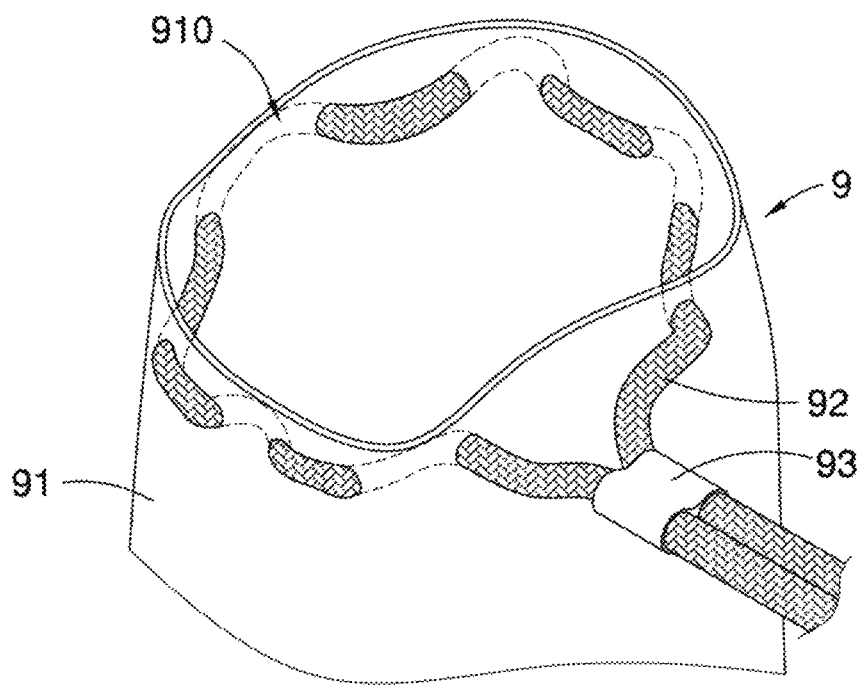
FIGS. 28 and 29 are partial perspective views of a drawstring bag 9 with a toggle 93 when bag opening 910 is opened and closed.
Figure 29:
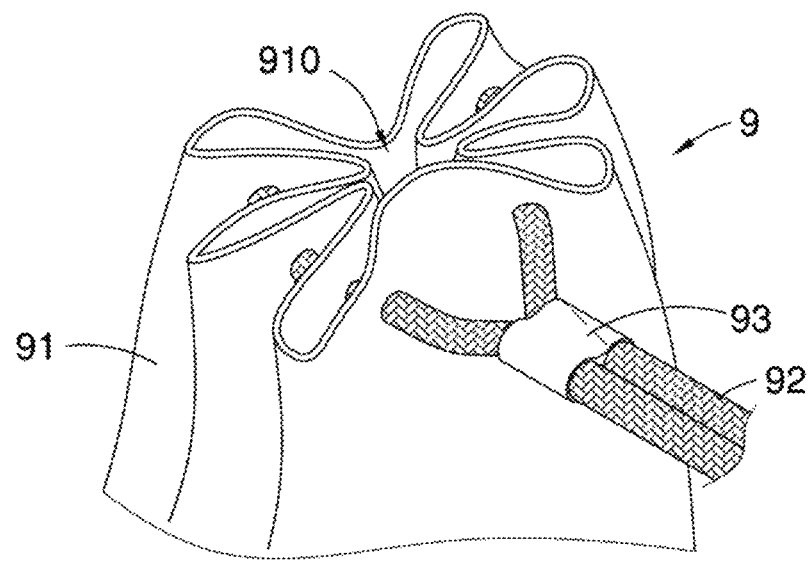

Additionally, the abovementioned drawstring 92 is of regular PVC or fabric material, but it is also able to be substituted by a drawstring 94 of FIGS. 26 and 27. The drawstring 94 comprises a metal rope 941 (e.g. a wire rope) and a cladding layer 942 of the shielded metal rope 941, the cladding layer 942 is able to be any of PVC or fabric material. Preferably, the cladding layer 942 also comprises an inner layer 942a of the shielded metal rope 941 and an outer layer 942b that further shields the inner layer 942a.

What is claimed is:

1. A drawstring lock comprising:
a housing capable of allowing two ends of a drawstring to pass through so that the drawstring comprises two inner portions within the housing, a looped section forming into a closed loop located outside of the housing, and two outer portions passing out of the housing;
a stop mechanism disposed on the housing and capable of being operated to stop or allow the two inner portions of the drawstring to shift relatively to the housing; and
a lock mechanism connected to the stop mechanism, wherein the stop mechanism is unable to be operated when the stop mechanism is locked by the lock mechanism and the stop mechanism is able to be operated when the stop mechanism is unlocked by the lock mechanism,
wherein the housing has a first through-hole capable of allowing the two ends of the drawstring to enter and a second through-hole capable of allowing the two ends of the drawstring to exit; the stop mechanism comprising a twist portion located within the housing and a twist button able to drive the twist portion to rotate, wherein the twist button is unable to drive the twist portion to rotate when the lock mechanism is operated in a locked state and the twist button is able to drive the twist portion to rotate when the lock mechanism is operated in an unlocked state; the twist portion having a channel allowing the two inner portions of the drawstring to pass through, wherein when the twist portion is rotated to an original position, the twist portion cannot twist the two inner portions of the drawstring so that the drawstring can be operated to shift relatively to the housing, wherein when the twist portion is rotated to an stopped position, the twist portion twists the two inner portions of the drawstring so that the drawstring cannot be operated to shift relatively to the housing.

2. The drawstring lock recited in claim 1 wherein the twist button is disposed rotatably on the housing and engaged to the twist portion so that the twist portion is able to be rotated along with the twist button.

3. The drawstring lock recited in claim 1 wherein the housing comprises two locking recesses in different position and the lock mechanism is configured on the twist portion and capable of rotating as the twist button and the twist portion rotates, and the lock mechanism comprising:

a combination lock assembly disposed on a top end of the lock mechanism and located within the twist button;

a press key connecting to the combination lock assembly, wherein when the combination lock assembly is dialed a correct combination code, the press key is shifted away from a position when the press key is pressed and shifted back to the position when the press key is released; and a lock block connected to the press key, wherein the lock block is capable to shift in and out of one of the locking recesses of the housing as the press key shifts when the twist portion is located at the original position, and the lock block is capable of shift in and out of the other locking recess of the housing as the press key shifts when the twist portion is located at the stopped position.

4. A drawstring lock comprising:

a housing capable of allowing two ends of a drawstring to pass through so that the drawstring comprises two inner portions within the housing, a looped section forming into a closed loop located outside of the housing, and two outer portions passing out of the housing;

a stop mechanism disposed on the housing and capable of being operated to stop or allow the two inner portions of the drawstring to shift relatively to the housing; and a lock mechanism connected to the stop mechanism, wherein the stop mechanism is unable to be operated when the stop mechanism is locked by the lock mechanism and the stop mechanism is able to be operated when the stop mechanism is unlocked by the lock mechanism, wherein the housing has two through-passages and the two through-passages each allowing the two ends of the drawstring to pass through, the stop mechanism comprising two stop blocks and a push portion, wherein the two stop blocks are capable of shifting laterally and each respectively located within two side holes of the two through-passages, wherein the push portion is located between the two stop blocks and is capable of shifting longitudinally for pushing the two stop blocks to press the two inner portions of the drawstring.

5. The drawstring lock recited in claim 4, push portion having a push block, wherein two opposite side surfaces of the push block are both inclined surfaces and each respectively faces the two stop blocks.

6. The drawstring lock recited in claim 4, the lock mechanism comprising a combination locking assembly connecting to the push portion, wherein when the combination locking assembly is dialed a correct combination code, the push portion can be shifted longitudinally, and when the combination locking assembly is dialed an incorrect combination code, the push portion cannot be shifted.

7. The drawstring lock recited in claim 4, a back side of the housing having a groove capable of storing one of the two outer portions of the drawstring, the push portion having a L-shaped block member and the L-shaped block member extending from the back side of the housing to block the outer portion of the drawstring in the groove.

8. A drawstring lock comprising:

a housing capable of allowing two ends of a drawstring to pass through so that the drawstring comprises two inner portions within the housing, a looped section forming into a closed loop located outside of the housing, and two outer portions passing out of the housing;

a stop mechanism disposed on the housing and capable of being operated to stop or allow the two inner portions of the drawstring to shift relatively to the housing; and a lock mechanism connected to the stop mechanism, wherein the stop mechanism is unable to be operated when the stop mechanism is locked by the lock mechanism and the stop mechanism is able to be operated when the stop mechanism is unlocked by the lock mechanism, wherein the housing comprises a main casing and two swing arms pivoted on the main casing, the two swing arms capable of swinging relatively to the main casing to an unfolded position and a folded position, each swing arms having a through-passage and a side hole communicating, the two through-passages capable of each allowing the respective two ends of the drawstring to pass through; the stop mechanism comprising two stop blocks and a pin portion, the two stop blocks secured onto two opposite side surfaces of the main casing and each respectively facing the two side holes of the two swing arms, the pin portion connected to the lock mechanism and capable of shifting longitudinally, the pin portion further comprising two blocking pins and the two blocking pins capable of each respectively be inserted into or retracted from two pin holes on the two swing arms.

9. The drawstring lock recited in claim 8, the lock mechanism comprising a combination locking assembly connecting to the pin portion, wherein when the combination locking assembly is dialed a correct combination code, the pin portion can be shifted longitudinally, wherein when the combination locking assembly is dialed an incorrect combination code, the pin portion is unable to be shifted.

* * * * *